US011068437B2

(12) United States Patent
Susairaj et al.

(10) Patent No.: US 11,068,437 B2
(45) Date of Patent: Jul. 20, 2021

(54) PERIODIC SNAPSHOTS OF A PLUGGABLE DATABASE IN A CONTAINER DATABASE

(71) Applicant: Oracle International Corporation, Redwood Shores, CA (US)

(72) Inventors: Margaret Susairaj, Sugar Land, TX (US); Giridhar Ravipati, Foster City, CA (US); Kumar Rajamani, San Ramon, CA (US); Yunrui Li, Fremont, CA (US); Jaebock Lee, Sunnyvale, CA (US); Sanket Jain, Sunnyvale, CA (US)

(73) Assignee: Oracle Interntional Corporation, Redwood Shores, CA (US)

( * ) Notice: Subject to any disclaimer, the term of this patent is extended or adjusted under 35 U.S.C. 154(b) by 209 days.

(21) Appl. No.: 15/266,340

(22) Filed: Sep. 15, 2016

(65) Prior Publication Data

US 2018/0075041 A1  Mar. 15, 2018
US 2020/0026774 A9  Jan. 23, 2020

Related U.S. Application Data

(60) Provisional application No. 62/245,937, filed on Oct. 23, 2015.

(51) Int. Cl.
*G06F 7/00* (2006.01)
*G06F 16/11* (2019.01)
*G06F 11/14* (2006.01)

(52) U.S. Cl.
CPC ........ *G06F 16/113* (2019.01); *G06F 11/1451* (2013.01); *G06F 11/1469* (2013.01); *G06F 11/1479* (2013.01); *G06F 2201/84* (2013.01)

(58) Field of Classification Search
CPC .............. G06F 16/113; G06F 2201/84; G06F 11/1451; G06F 11/1469; G06F 11/1479; G06F 16/27
See application file for complete search history.

(56) References Cited

U.S. PATENT DOCUMENTS

| 5,564,037 | A | 10/1996 | Lam |
| 5,953,729 | A | 9/1999 | Cabrera |
| 6,185,699 | B1 | 2/2001 | Haderle |
| 6,205,449 | B1 | 3/2001 | Rastogi |
| 6,226,650 | B1 | 5/2001 | Mahajan |

(Continued)

OTHER PUBLICATIONS

U.S. Appl. No. 14/202,091, filed Mar. 10, 2014, Notice of Allowance, dated Feb. 26, 2016.

(Continued)

*Primary Examiner* — Azam M Cheema
(74) *Attorney, Agent, or Firm* — Hickman Becker Bingham Ledesma LLP

(57) ABSTRACT

Techniques are provided for using a sparse file to create a hot archive of a pluggable database of a container database. In an embodiment and while a source pluggable database is in service, a source database server creates a clone of the source pluggable database. Also while the source pluggable database is in service, the source database server creates an archive of the source pluggable database that is based on the clone. Eventually, a need arises to consume the archive. A target database server (which may also be the source database server) creates a target pluggable database based on the archive.

20 Claims, 7 Drawing Sheets

(56) References Cited

U.S. PATENT DOCUMENTS

| | | |
|---|---|---|
| 6,295,610 B1 | 9/2001 | Ganesh |
| 6,502,102 B1 | 12/2002 | Haswell |
| 6,633,878 B1 | 10/2003 | Underwood |
| 6,638,878 B2 | 10/2003 | Restaino |
| 6,804,671 B1 | 10/2004 | Loaiza et al. |
| 6,973,647 B2 | 12/2005 | Crudele |
| 6,983,295 B1 | 1/2006 | Hart |
| 7,010,663 B2 | 5/2006 | George et al. |
| 7,136,857 B2 | 11/2006 | Chen |
| 7,305,421 B2 | 12/2007 | Cha |
| 7,418,435 B1 | 8/2008 | Sedlar |
| 7,475,098 B2 | 1/2009 | Patterson |
| 7,571,173 B2 | 8/2009 | Yang |
| 7,620,620 B1 | 11/2009 | Sedlar |
| 7,620,623 B2 | 11/2009 | Sedlar |
| 7,822,717 B2 | 10/2010 | Kappor et al. |
| 8,061,085 B2 | 11/2011 | Anderson |
| 8,065,320 B2 | 11/2011 | Sedlar |
| 8,117,174 B2 | 2/2012 | Shaughessey |
| 8,161,085 B2 | 4/2012 | Souder |
| 8,364,648 B1 | 1/2013 | Sim-Tang |
| 8,478,718 B1 | 7/2013 | Ranade |
| 8,554,762 B1 | 10/2013 | O'Neill |
| 8,756,197 B1* | 6/2014 | Wilde ............... G06F 17/00 |
| | | 707/640 |
| 8,805,849 B1 | 8/2014 | Christensen |
| 9,026,679 B1 | 5/2015 | Shrnuylovich |
| 9,239,869 B1 | 1/2016 | Zhang |
| 9,280,591 B1 | 3/2016 | Kharatishvili |
| 9,298,564 B2* | 3/2016 | Lee ............... G06F 12/084 |
| 9,390,120 B1 | 7/2016 | Gulliver |
| 9,396,220 B2 | 7/2016 | Li |
| 9,507,843 B1 | 11/2016 | Madhavarapu |
| 9,575,849 B2 | 2/2017 | Mittal |
| 9,684,561 B1 | 6/2017 | Yan |
| 9,817,836 B2 | 11/2017 | Zha |
| 9,940,203 B1 | 4/2018 | Ghatnekar |
| 2002/0112022 A1 | 8/2002 | Kazar et al. |
| 2002/0143733 A1 | 10/2002 | Mukkarnalla |
| 2003/0050932 A1 | 3/2003 | Pace |
| 2003/0061537 A1 | 3/2003 | Cha et al. |
| 2003/0074360 A1 | 4/2003 | Chen |
| 2003/0074492 A1 | 4/2003 | Cochran |
| 2003/0093408 A1 | 5/2003 | Brown et al. |
| 2003/0158863 A1 | 8/2003 | Haskin |
| 2003/0167255 A1 | 9/2003 | GraBhoff et al. |
| 2004/0039962 A1 | 2/2004 | Ganesh |
| 2004/0054643 A1 | 3/2004 | Vermuri |
| 2004/0054644 A1 | 3/2004 | Ganesh |
| 2004/0177099 A1 | 9/2004 | Ganesh |
| 2004/0210577 A1 | 10/2004 | Kundu |
| 2004/0267809 A1 | 12/2004 | East et al. |
| 2004/0268068 A1 | 12/2004 | Curran |
| 2005/0038831 A1 | 2/2005 | Souder et al. |
| 2005/0246397 A1 | 11/2005 | Edwards |
| 2005/0256908 A1 | 11/2005 | Yang |
| 2005/0283478 A1 | 12/2005 | Choi |
| 2006/0047626 A1 | 3/2006 | Raheem |
| 2006/0047713 A1 | 3/2006 | Gornshtein |
| 2006/0179261 A1 | 8/2006 | Rajan |
| 2006/0230035 A1 | 10/2006 | Bailey et al. |
| 2007/0083563 A1 | 4/2007 | Souder |
| 2007/0100912 A1 | 5/2007 | Pareek et al. |
| 2007/0244918 A1 | 10/2007 | Lee et al. |
| 2008/0028007 A1* | 1/2008 | Ishii ............... G06F 11/1451 |
| 2008/0052266 A1 | 2/2008 | Goldstein et al. |
| 2008/0072003 A1 | 3/2008 | Vu |
| 2008/0162491 A1 | 7/2008 | Becker |
| 2008/0162842 A1 | 7/2008 | Boutcher |
| 2008/0208820 A1 | 8/2008 | Usey |
| 2008/0244028 A1 | 10/2008 | Le |
| 2008/0256311 A1 | 10/2008 | Lee |
| 2009/0282203 A1 | 11/2009 | Haustein |
| 2010/0250499 A1 | 9/2010 | McAlister |
| 2010/0318570 A1 | 12/2010 | Narasinghanallur et al. |
| 2011/0004586 A1 | 1/2011 | Cherryholmes et al. |
| 2011/0060724 A1 | 3/2011 | Chan |
| 2011/0087633 A1 | 4/2011 | Kreuder et al. |
| 2011/0191296 A1 | 8/2011 | Wall |
| 2011/0307447 A1 | 12/2011 | Sabaa |
| 2011/0307450 A1 | 12/2011 | Hahn et al. |
| 2012/0017060 A1 | 1/2012 | Kapanipathi |
| 2012/0109926 A1 | 5/2012 | Novik et al. |
| 2012/0221534 A1 | 8/2012 | Gao et al. |
| 2012/0259815 A1* | 10/2012 | Olson ............... G06F 11/1458 |
| | | 707/649 |
| 2012/0284228 A1 | 11/2012 | Ghosh |
| 2012/0287282 A1 | 11/2012 | Lu |
| 2012/0323849 A1 | 12/2012 | Garin |
| 2013/0054531 A1 | 2/2013 | Susairaj |
| 2013/0085742 A1 | 4/2013 | Baker et al. |
| 2013/0103644 A1 | 4/2013 | Shoens et al. |
| 2013/0117237 A1 | 5/2013 | Thomsen et al. |
| 2013/0198133 A1 | 8/2013 | Lee |
| 2013/0212068 A1 | 8/2013 | Talius et al. |
| 2013/0297722 A1 | 11/2013 | Wright |
| 2013/0311520 A1 | 11/2013 | Nakagawa |
| 2014/0006354 A1 | 1/2014 | Parkinson |
| 2014/0095452 A1 | 4/2014 | Lee et al. |
| 2014/0095530 A1 | 4/2014 | Lee et al. |
| 2014/0095546 A1 | 4/2014 | Kruglikov et al. |
| 2014/0108352 A1 | 4/2014 | Ahrens |
| 2014/0164331 A1 | 6/2014 | Li et al. |
| 2014/0188804 A1 | 7/2014 | Gokhale |
| 2014/0258239 A1 | 9/2014 | Amlekar |
| 2014/0258241 A1 | 9/2014 | Chen |
| 2015/0019909 A1 | 1/2015 | Griffith |
| 2015/0120659 A1 | 4/2015 | Srivastava |
| 2015/0120780 A1* | 4/2015 | Jain ............... H04L 41/5054 |
| | | 707/783 |
| 2015/0154105 A1 | 6/2015 | Chaurasia |
| 2015/0254240 A1* | 9/2015 | Li ............... G06F 16/27 |
| | | 707/703 |
| 2015/0370641 A1* | 12/2015 | Susairaj ............... G06F 3/06 |
| | | 707/645 |
| 2016/0092454 A1 | 3/2016 | Tao |
| 2016/0092534 A1 | 3/2016 | Choudhury et al. |
| 2016/0110292 A1 | 4/2016 | Choi |
| 2016/0171029 A1 | 6/2016 | Sanvido |
| 2016/0188621 A1 | 6/2016 | Karinta et al. |
| 2017/0116207 A1 | 4/2017 | Lee |
| 2017/0116249 A1 | 4/2017 | Ravipati |
| 2017/0116298 A1 | 4/2017 | Ravipati |
| 2017/0315877 A1 | 11/2017 | Kaplingat |
| 2017/0357550 A1 | 12/2017 | Jain |
| 2018/0060177 A1 | 3/2018 | Shanthaveerappa |
| 2018/0060181 A1 | 3/2018 | Rajamani |
| 2021/0056123 A1 | 2/2021 | Lee |

OTHER PUBLICATIONS

U.S. Appl. No. 13/830,349, filed Mar. 14, 2013, Office Action dated Nov. 5, 2014.

U.S. Appl. No. 13/830,349, filed Mar. 14, 2013, Notice of Allowance, dated Oct. 19, 2015.

U.S. Appl. No. 13/830,349, filed Mar. 14, 2013, Interview Summary, dated Mar. 9, 2015.

U.S. Appl. No. 13/830,349, filed Mar. 14, 2013, Final Office Action, dated Jun. 2, 2015.

U.S. Appl. No. 13/631,815, filed Sep. 28, 2012, Office Action, dated Nov. 6, 2014.

U.S. Appl. No. 13/631,815, filed Sep. 28, 2012, Notice of Allowance, dated Aug. 20, 2015.

U.S. Appl. No. 13/631,815, filed Sep. 8, 2012, Notice of Allowance, dated Apr. 3, 2015.

U.S. Appl. No. 13/631,815, filed Sep. 28, 2012, Office Action, dated Dec. 23, 2013.

U.S. Appl. No. 13/631,815, filed Sep. 28, 2012, Office Action, dated May 29, 2014.

Tao, U.S. Appl. No. 14/849,012, filed Sep. 9, 2015, Office Action, dated Dec. 11, 2017.

(56) References Cited

OTHER PUBLICATIONS

Rajeev Kumar et al., Oracle DBA, A Helping Hand, Container Database and Pluggable Database (CDB & PDB), retrieved from the internet on Dec. 4, 2013, 2 pages.
Preimesberger, Chris, "Oracle Profits Up, but Revenues Slip" Oracle, dated Sep. 20, 2012, 2 pages.
Oracle Base, Multitenant: Create and Configure a Pluggable Database (PDB) in Oracle Database 12c Release 1 (12.1), dated Jan. 8, 2014, 16 pages.
Muhammad Anwar, "How to Install Oracle 12c Multitenant Pluggable Database", Dated Feb. 24, 2012, 27 pages.
Garcia-Molina et al., "Database System Implemention", dated Jan. 1, 2000, 84 pages.
Francisco Munoz et al., "Oracle Database 12c Backup and Recovery Survival Guide", dated Sep. 24, 2013, 8 pages.
Dominic Betts et al., "Developing Multi-Tenant Applications for the Cloud", 3rd Edition, Microsoft, 2012, 246 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CD8) and Pluggable Databases (PDB)", dated Mar. 3, 2014, 4 pages.
Anonymous, :An Oracle White Paper Oracle Database Appliance: Migration Strategies, dated Jun. 2012, 14 pages.
Lee U.S. Appl. No. 14/692,602, filed Apr. 21, 2015, Notice of Allowance, dated Jun. 30, 2017.
Shanthaveerappa, U.S. Appl. No. 15/244,867, filed Aug. 23, 2016, Office Action, dated Jun. 28, 2018.
Rajamani, U.S. Appl. No. 15/254,884, filed Sep. 1, 2016, Office Action, dated Jun. 27, 2018.
Kruglikov, U.S. Appl. No. 15/266,902, filed Sep. 15, 2016, Office Action, dated Aug. 6, 2018.
Oracle, "Database Concepts", Backup and Recovery, dated 2016, 24 pages.
Susairaj, U.S. Appl. No. 14/313,926, filed Jun. 24, 2014, Office Action, dated Nov. 2, 2017.
Choudhury, U.S. Appl. No. 14/823,212, filed Aug. 11, 2015, Office Action, dated Sep. 28, 2017.
Warden, Tim, "Storage Pooling, Thin Povisioning and Over-Subscription"., Las Solanas Consulting, dated Jul. 3, 2010, www.las-solanas.comstorage_virtualization/thin_provisioning.php>, 4 pages.
Walrond, Dan, "Using Netcat and Tar to Quickly Transfer Files Between Machines, AKA Tar Pipe", N.D. Accessed dated Oct. 19, 2017, web.archive.org/web/20130925161957/http://toast.djw.org, 9 pgs.
Haynes, T. "Network File System (NFS) Verison 4 Minor Version 2 Protocol", IERF Tools, dated May 17, 2014, from <tools.ietf.org/html/draft-ietf-nfsv4-minorversion2-24>, 8 pages.
Free Software Foundation, Inc., "GNU Tar: An Archiver Tool", dated Sep. 24, 2013, www.gnu.org/software/tar/manual/html_node/index.html_ 6 pages.
Tao, U.S. Appl. No. 14/849,012, filed Sep. 9, 2015, Notice of Allowance, dated Jan. 22, 2019.
Shanthaveerappa, U.S. Appl. No. 15/244,867, filed Aug. 23, 2016, Final Office Action, dated Jan. 24, 2019.
Ravipati, U.S. Appl. No. 15/215,443, filed Jul. 20, 2016, Interview Summary, dated Jan. 4, 2019.
Ravipati, U.S. Appl. No. 15/215,435, filed Jul. 20, 2016, Interview Summary, dated Jan. 4, 2019.
Krugikov, U.S. Appl. No. 15/266,902, filed Sep. 15, 2016, Interview Summary, dated Feb. 20, 2019.
Krugikov, U.S. Appl. No. 15/266,902, filed Sep. 15, 2016, Final Office Action, dated Jan. 31, 2019.
Tao, U.S. Appl. No. 14/849,012, filed Sep. 9, 2015, Advisory Action, dated Nov. 21, 2018.
Shanthaveerappa, U.S. Appl. No. 15/244,867, filed Aug. 23, 2016, Interview Summary, dated Oct. 30, 2018.
Rajamani, U.S. Appl. No. 15/254,884, filed Sep. 1, 2016, Final Office Action, dated Nov. 21, 2018.
Lee, U.S. Appl. No. 15/215,446, filed Jul. 20, 2016, Office Action, dated Nov. 16, 2018.
Tao, U.S. Appl. No. 14/849,012, filed Sep. 9, 2015, Final Office Action, dated Aug. 31, 2018.
Ravipati, U.S. Appl. No. 15/215,443, filed Jul. 20, 2016, Office Action, dated Sep. 19, 2018.
Ravipati, U.S. Appl. No. 15/215,435, filed Jul. 20, 2016, Office Action, dated Sep. 19, 2018.
Rajamani, U.S. Appl. No. 15/254,884, filed Sep. 1, 2016, Interview Summary, dated Sep. 24, 2018.
Lee, U.S. Appl. No. 15/215,446, filed Jul. 20, 2016, Restrcition Requirement, dated Oct. 1, 2018.
Kruglikov, U.S. Appl. No. 15/266,902, filed Sep. 15, 2016, Interview Summary, dated Oct. 1, 2018.
Choudhury, U.S. Appl. No. 14/823,212, filed Aug. 11, 2015, Notice of Allowance, dated Oct. 18, 2018.
Lee, U.S. Appl. No. 15/215,446, filed Jul. 20, 2016, Notice of Allowance, dated Aug. 21, 2020.
Lee, U.S. Appl. No. 15/215,446, filed Jul. 20, 2020, Interview Summary, dated Aug. 11, 2020.
Ravipati, U.S. Appl. No. 15/215,435, filed Jul. 20, 2016, Advisory Action, dated Jan. 24, 2020.
Ravipati, U.S. Appl. No. 15/215,435, filed Jul. 20, 2016, Interview Summary, dated Jan. 15, 2020.
Susairaj, U.S. Appl. No. 14/313,926, filed Jun. 24, 2014, Office Action, dated Apr. 4, 2019.
Shanthaveerappa, U.S. Appl. No. 15/244,867, filed Aug. 23, 2016, Notice of Allowance, dated Apr. 4, 2019.
Ravipati, U.S. Appl. No. 15/215,443, filed Jul. 20, 2016, Advisory Action, dated Jun. 5, 2019.
Ravipati, U.S. Appl. No. 15/215,435, filed Jul. 20, 2019, Advisory Action, dated Jun. 5, 2019.
Lee, U.S. Appl. No. 15/215,446, filed Jul. 20, 2016, Interview Summary, dated May 3, 2019.
Lee, U.S. Appl. No. 15/215,446, filed Jul. 20, 2016, Advisory Action, dated Jun. 4, 2019.
Choudhury, U.S. Appl. No. 14/823,212, filed Aug. 11, 2015, Notice of Allowance, dated Apr. 19, 2019.
Susairaji, U.S. Appl. No. 14/313,926, filed Jun. 24, 2014, Notice of Allowance, dated Jun. 25, 2020.
Ravipati, U.S. Appl. No. 15/215,443, filed Jul. 20, 2016, Office Action, dated May 6, 2020.
Susairaj, U.S. Appl. No. 14/313,926, filed Jun. 24, 2014, Interview Summary, dated Jun. 24, 2019.
Ravipati, U.S. Appl. No. 15/215,443, filed Jul. 20, 2016, Office Action, dated Jul. 18, 2019.
Lee, U.S. Appl. No. 15/215,446, filed Jul. 20, 2016, Office Action, dated May 8, 2020.
Sata's DBA Blog: "Oracle Statistics", dated Jan. 3, 2013, http://satya-dba.blogspot.com/2010/06/oracle-database-statistics-rbo-cbo.html, 14 pages.
Ravipati, U.S. Appl. No. 15/215,443, filed Jul. 20, 2016, Notice of Allowance, dated Oct. 15, 2020.
Ravipati, U.S. Appl. No. 15/215,435, filed Jul. 20, 2016, Notice of Allowance, dated Oct. 15, 2020.
Shanthaveerappa, U.S. Appl. No. 15/244,867, filed Aug. 23, 2016, Notice of Allowance, dated Nov. 5, 2019.
Ravipati, U.S. Appl. No. 15/215,443, filed Jul. 20, 2016, Final Office Action, dated Dec. 4, 2019.
Rajamani, U.S. Appl. No. 15/254,884, filed Sep. 1, 2016, Notice of Allowance, dated Nov. 20, 2019.
Lee, U.S. Appl. No. 15/215,446, filed Jul. 20, 2019, Final Office Action, dated Dec. 4, 2019.
Krugikov, U.S. Appl. No. 15/266,902, filed Sep. 15, 2016, Notice of Allowance, dated Nov. 2, 2019.

* cited by examiner

PERIODIC SNAPSHOTS OF A PLUGGABLE DATABASE IN A CONTAINER DATABASE

CROSS-REFERENCE TO RELATED APPLICATIONS

This application claims the benefit of Provisional Application No. 62/245,937, filed Oct. 23, 2015, the entire contents of which is hereby incorporated by reference for all purposes as if fully set forth herein. This application is related to the following applications, each of which is incorporated by reference as if fully set forth herein:

Application Ser. No. 13/631,815, filed Sep. 28, 2012, titled "Container Database";

U.S. Pat. No. 9,298,564, filed Mar. 14, 2013, titled "In Place Point-In-Time Recovery Of Pluggable Databases";

Application Ser. No. 14/202,091, filed Mar. 10, 2014, titled "Instantaneous Unplug Of Pluggable Database From One Container Database And Plug Into Another Container Database";

Application Ser. No. 15/093,506, filed Apr. 7, 2016, titled "Migrating A Pluggable Database Between Database Server Instances With Minimal Impact To Performance";

Application Ser. No. 15/215,443, filed Jul. 20, 2016, titled "Techniques For Keeping A Copy Of A Pluggable Database Up To Date With A Source Pluggable Database In Read-Write Mode";

Application Ser. No. 15/215,435, filed Jul. 20, 2016, titled "Cloning A Pluggable Database In Read-Write Mode"; and Application Ser. No. 15/215,446, filed Jul. 20, 2016, titled "Near-zero Downtime Relocation of a Pluggable Database across Container Databases".

FIELD OF THE DISCLOSURE

This disclosure relates to database restoration for multi-tenant database systems. Techniques are presented for using a sparse file to create a hot archive of a pluggable database of a container database.

BACKGROUND

Database consolidation involves distributing and sharing computing resources among multiple databases managed by one or more database servers of database management systems (DBMS). Databases may be consolidated using a container DBMS. A consolidated database, such as a multitenant container database (CDB), includes one or more pluggable databases (PDBs). In a container DBMS, each pluggable database may be opened or closed in the container database independently from other pluggable databases.

Pluggable databases may be "plugged in" to a container database, and may be transported between database servers and/or DBMSs. The container DBMS may manage multiple pluggable databases and a given database server instance may serve those pluggable databases from the container database. As such, a given container database allows multiple pluggable databases to run on the same database server and/or database server instance, allowing the computing resources of a single database server or instance to be shared between multiple pluggable databases.

An application may access a pluggable database by establishing a database session on the container DBMS for that pluggable database, where a database session represents the connection between an application and the container DBMS for accessing the pluggable database. A database session is initiated for a pluggable database by, for example, transmitting a request for a new connection to the container DBMS, the request specifying the pluggable database. A container DBMS may host multiple database sessions, each database session being for one of multiple pluggable databases.

The architecture of a container DBMS greatly facilitates transporting databases between database servers and/or DBMSs. Tablespace files and a data dictionary store may be moved between environments of container DBMSs using readily available mechanisms for copying and moving files. The tablespace files, along with one or more dictionary files, are referred to herein collectively as a transportable database package. However, a transportable database package is a logical set of loose files, which may be difficult to identify and manage.

Once the transportable database package of a pluggable database is moved to the environment of the target container DBMS, the pluggable database can be plugged into the target container DBMS. In an embodiment, plugging in the pluggable database is performed in response to receiving a DDL command to plug in the pluggable database, the DDL command also identifying the transportable database package. In response to receiving the DDL command, the container DBMS plugs in the pluggable database. Plugging in the pluggable database entails such operations as updating a root database dictionary to define the pluggable database, such updates including, for example, adding a record to a metadata table. Error checking is also performed. For example, checks are performed to ensure that the name of the pluggable database is unique within the container DBMS and that tablespace files are not already being used for other tablespaces in the container DBMS.

A container DBMS provides advantages for database consolidation. Among such advantages is providing a high degree of isolation concurrently along with a high degree of resource sharing. Multiple pluggable databases may run on the same database server and/or database server instance, allowing the computing resources of a single database server or instance to be shared between multiple pluggable databases.

The isolation provided by a container DBMS is at an existential level. The users of a database session established for a pluggable database may only access or otherwise view database objects defined via the attached pluggable database dictionary. Database objects of other pluggable databases cannot be accessed or viewed. This degree of isolation is extended to administrators.

Another important advantage is fast provisioning of databases. A transportable database package of a source pluggable database may be copied to quickly create a new target pluggable database. A transportable database package of an existing pluggable database may be copied to quickly to create a clone of the source pluggable database. The provisioning of a pluggable database is primarily bounded by the time required to copy files of the transportable database package and to process one or more DDL commands that require relatively little updating of metadata or other type of processing.

The isolation provided by a container DBMS means that data corruption, such as caused by a crash (catastrophic hardware or software failure), may be limited to one or few pluggable databases. As such, a mechanism is needed to restore an individual pluggable database.

However, content needed to restore a pluggable database to a particular moment in the past may consume storage space. A way is needed to minimize the storage footprint of unused restoration content.

Furthermore, copying and moving pluggable databases may introduce complexity. For example, the loose files to transfer and other manual steps needed to copy or move a pluggable database may be unclear or otherwise error prone for a database administrator.

Furthermore, container databases readily accept installations of pluggable databases, which encourages distributed deployment, replication, horizontal scaling, and bulk deployment throughout a cluster. As such, pluggable databases may benefit from a content interchange format that is durable, reusable, and eases installation.

Furthermore, a pluggable database may be huge. A restoration content format for pluggable databases should encourage huge datasets without stressing storage capacity.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example System Of Computers
  2.1 Pluggable Database
  2.2 Hot Clone
  2.3 Pluggable Database Archive
  2.4 Plugging In
  2.5 Crash Recovery
3.0 Hot Archive Process
  3.1 Archive Consumption
4.0 Archive File
  4.1 Compression
  4.2 Inventory Of Archive Files
  4.3 Inventory Details
5.0 Sparse Cloning
  5.1 Sparse Files
6.0 Copy On Write
7.0 Repeated Archiving
  7.1 Automatic Repetition
8.0 Hardware Overview 1.0 GENERAL OVERVIEW Techniques are provided for using a sparse file to create a hot clone of a pluggable database of a container database. In an embodiment and while a source pluggable database is in service, a source database server creates a clone of the source pluggable database. While the source pluggable database is in service, the source database server creates an archive of the source pluggable database that is based on the clone. Eventually, a need arises to consume the archive. A target database server (which may also be the source database server) creates a target pluggable database based on the archive.

Applying the archive to the target pluggable database may accomplish a variety of alternative scenarios. In one case, the archive is used to restore a particular historical version of the contents of the source pluggable database. In another case, the archive is used to recover the contents of the source pluggable database after the source pluggable database has been corrupted.

In an embodiment, the source database server repeatedly creates clones and archives of a same pluggable database. In an embodiment, repeated creations occur automatically and periodically according to a schedule.

In an embodiment, a source container database of the source pluggable database contains metadata that inventories existing archives of the source pluggable database. In an embodiment, each archive is stored within its own archive file.

2.0 EXAMPLE SYSTEM OF COMPUTERS

Figure 1:
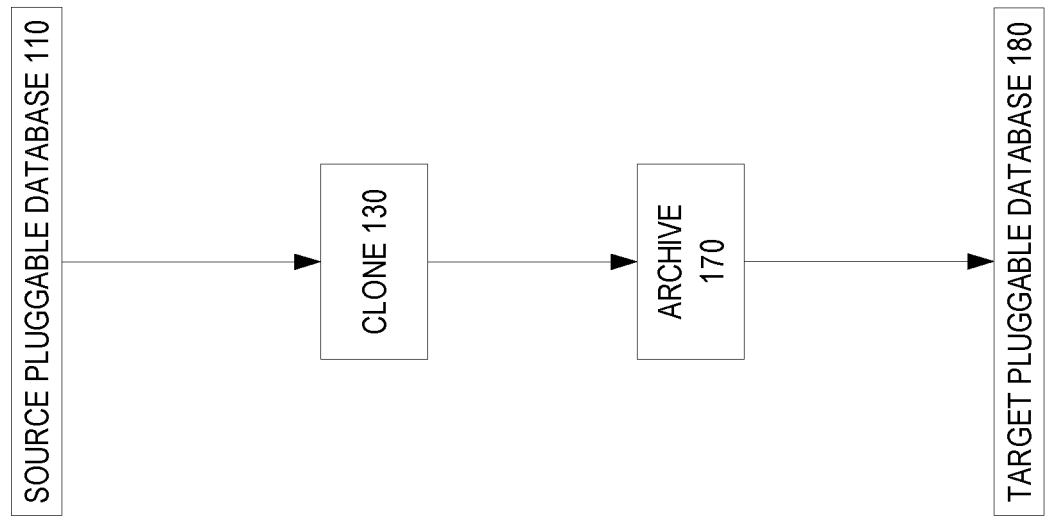
FIG. 1 is a block diagram that depicts an example system of computers that uses a sparse file to create a hot archive of a pluggable database of a container database, in an embodiment.

FIG. 1 is a block diagram that depicts an example system of computers 100, in an embodiment. System 100 creates a hot clone of a source pluggable database of a container database and uses the clone to export an archive of the source pluggable database.

System 100 may be composed of one or more computers, including rack servers such as blades, personal computers, mainframes, network appliances, virtual machines, or other computing devices. System 100 may access data that is stored in memory, on disks, or over a network.

2.1 Pluggable Database

Computer system 100 hosts a source database server that includes a source container database. The source database server may be a relational database management system (RDBMS) or other database software instance that is capable of hosting a container database that may have multiple pluggable databases.

The source container database contains file resources, such as executables, that provide infrastructural features to the pluggable databases within the source container database. The source container database includes one or more pluggable databases, such as source pluggable database 110.

Source pluggable database 110 may be an independent database that may be moved or copied from one container database to another. For example, source pluggable database 110 may contain a schema of related tables, such as defined by data definition language (DDL), and their records.

2.2 Hot Clone

At arbitrary times, such as while source pluggable database 110 is in service and in demand, the source database server may make a clone of source pluggable database 110, such as clone 130. Although not shown, source pluggable database 110 may have more clones.

Both of clone 130 and source pluggable database 110 are pluggable databases that occupy a same source container database of the source database server. In an embodiment, the source database server does not allow clients to connect to clone 130.

Clone 130 is a hot clone. I.e., it was copied from source pluggable database 110 while source pluggable database 110 was live and possibly busy with transactions.

As such, cloning may have occurred while the contents of source pluggable database 110 were mutating. Consequently, clone 130 may naturally lack data consistency.

However, the source database server may roll clone 130 back to a consistent state. In an embodiment, the source database server applies, to clone 130, undo records of transactions that remained open (uncommitted) during cloning. Undo records capture the prior contents of data blocks to facilitate rolling backward (rewinding) a data block to retract (revert) a recent change.

In an embodiment, the source database server rolls backward (applies the undo records) clone 130 during or immediately after creating clone 130 to purge uncommitted transactions from clone 130. This involves reading undo records from clone 130. Another embodiment does not roll backward clone 130, but instead later rolls backward any target pluggable database that is created from archive 170 (explained below).

The source database server may retrieve and apply undo records from clone 130 that originally occurred in source pluggable database 110 and that have a higher version number or timestamp than that of the last transaction committed before creation of clone 130 began.

2.3 Pluggable Database Archive

After creating clone 130, the source database server may use clone 130 to create archive 170 of source pluggable database 110. In an embodiment, creating archive 170 requires stopping and/or unplugging (deleting) clone 130 from the source container database.

When clone 130 is stopped, archive 170 may be created based on clone 130. Archive 170 contains one or more files that contain data and metadata needed to preserve the contents of clone 130 in an external interchange format that may later be used to reconstitute the same pluggable database in a same container database or a different container database to the same content version as when clone 130 was created.

2.4 Plugging In

A database administrator may use archive 170 to create an independently operable copy of source pluggable database 110, such as target pluggable database 180. Pluggable databases 110 and 180 may occupy a same container database or different container databases on a same or different computers. For example, the database administrator may issue a command to a target database server to use archive 170 to create target pluggable database 180.

2.5 Crash Recovery

In operation, a data file of source pluggable database 110 may become corrupt. Clone 130 may be used to restore source pluggable database 110. In an embodiment, the source database server drops source pluggable database 110 immediately before recreating source pluggable database 110 within the same source container database from archive 170.

Furthermore after creation of clone 130, source pluggable database 110 may have experienced additional content changes that may need propagating into target pluggable database 180. Such changes are recorded as redo records that describe a change (delta) to logical records (table rows).

The target database server of target pluggable database 180 may retrieve redo logs (containing redo records) from source pluggable database 110, such as by a filesystem cross-mount that is shared by the source and target database servers. The target database server may roll forward (catch up) target pluggable database 180 by replaying (applying) these redo logs to target pluggable database 180.

3.0 HOT ARCHIVE PROCESS

Figure 2:
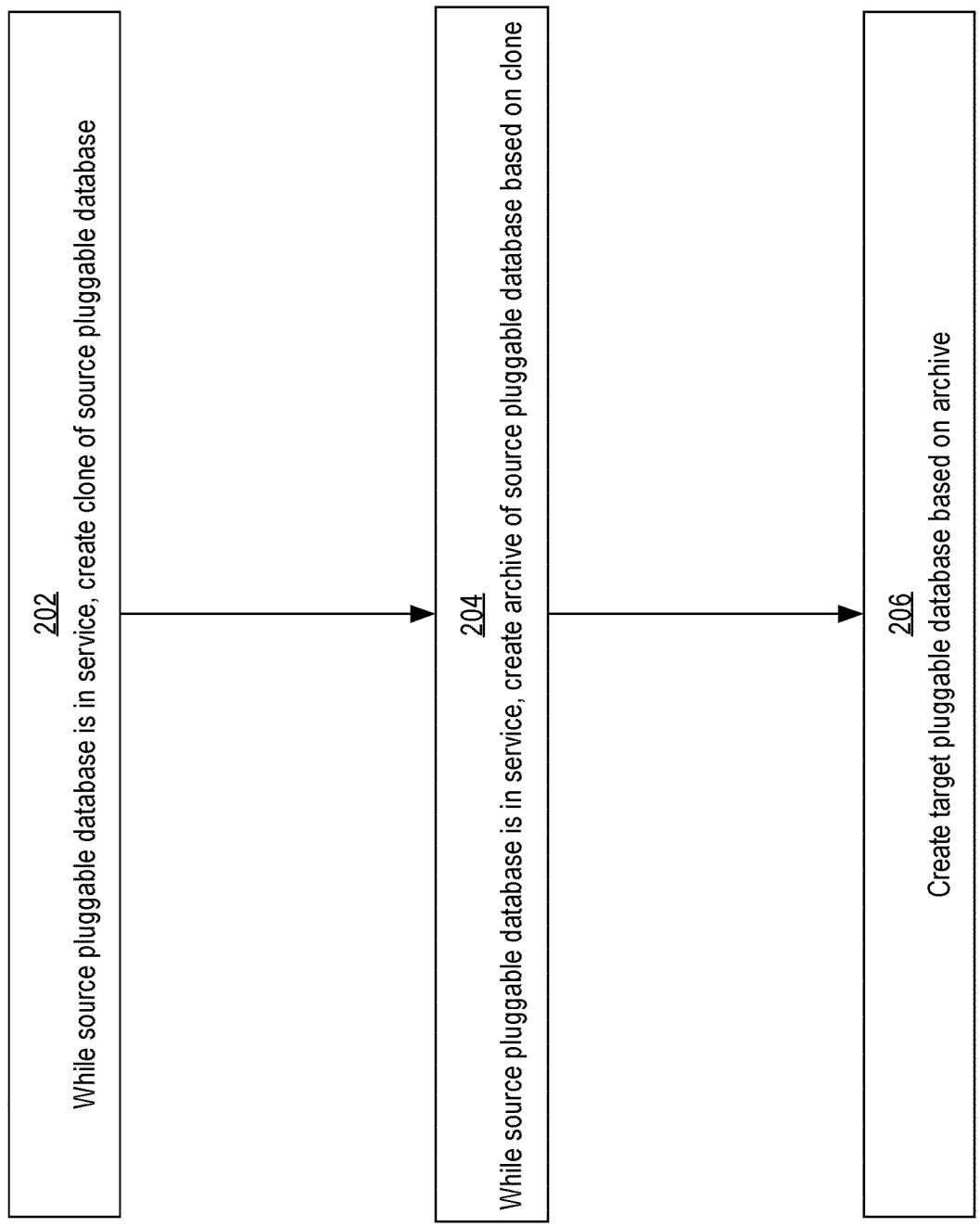
FIG. 2 is a flow diagram that depicts an example process that uses a sparse file to create a hot archive of a pluggable database of a container database, in an embodiment.

FIG. 2 is a flow diagram that depicts an example process that creates a hot clone of a source pluggable database of a container database and uses the clone to export an archive of the source pluggable database. FIG. 2 is discussed with reference to FIG. 1.

A source pluggable database remains operational during steps 202 and 204. Steps 202 and 204 are preparatory.

In step 202, a clone is created from a source pluggable database that is in service. For example, a database administrator submits a command to the source database server to create clone 130 from source pluggable database 110 within the container database of source pluggable database 110 while source pluggable database 110 is being used by clients.

Step 204 may more or less immediately follow step 202. In step 204, an archive is created of the source pluggable database while the source pluggable database is in service.

Because clone 130 is a recent copy of source pluggable database 110, clone 130 may be used as a proxy of source pluggable database 110 when creating the archive. For example, the source database server may create archive 170 from clone 130. Likewise, archive 170 may act as an archive of source pluggable database 110, even though archive 170 is actually created from clone 130.

In an embodiment, stopping or unplugging clone 130 is a preface or cause to create archive 170. By the end of step 204, archive 170 is complete and ready for subsequent use.

3.1 Archive Consumption

An arbitrary delay may occur between steps 204 and 206. In step 206, a target pluggable database is created from the archive. Step 206 may occur during various scenarios.

For example, step 206 may be part of recovering source pluggable database 110 after a data corruption. In another example, step 206 may be part of creating target pluggable database 180 as an historical copy of source pluggable database 110 within the same or a different container database. In yet another example, step 206 may be part of moving source pluggable database 110 from one container database to another.

4.0 ARCHIVE FILE

Figure 3:
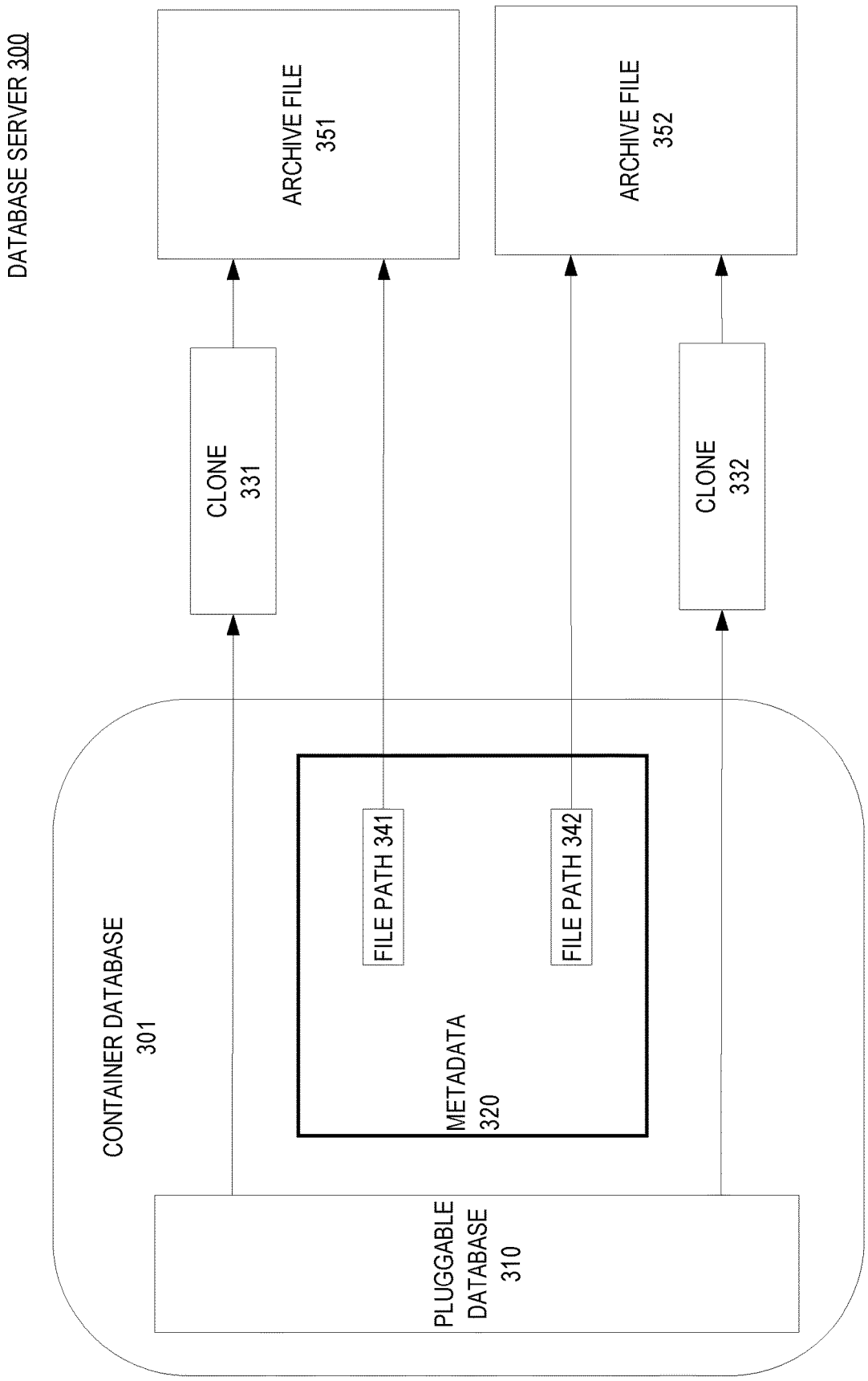
FIG. 3 is a block diagram that depicts an example container database that encapsulates each pluggable database archive into a separate monolithic archive file and maintains a listing of those archive files, in an embodiment.

FIG. 3 is a block diagram that depicts an example database server 300 that encapsulates each pluggable database archive into a separate monolithic archive file and maintains a listing of those archive files, in an embodiment. Database server 300 may be an implementation of the source database server described in the discussion of FIG. 1.

Database server 300 includes source container database 301 that contains source pluggable database 310. Either automatically as scheduled or manually, database server 300 repeatedly creates clones such as 331-332.

From each clone of 331-332, database server 300 creates a pluggable database archive file, such as 351-352 respectively. For each archive of clones 331-332, database server 300 creates an archive file, such as 351-352, and populates the archive file with the files of the clone. As such, archive file 351 is a monolithic file that may encapsulate multiple data files of clone 331.

4.1 Compression

Archive file 351 may be a tarball (tar file) or a compressed archive, such as a zip file. Archive file 351 may be an archive of individually compressed files or a compressed archive of raw files. Compression may entail encodings such as dictionary or run length.

4.2 Inventory of Archive Files

Archive file 351 may contain metadata for self-description of archive file 351 and its contained files. Archive file 351 may be logically operated as an interchange cartridge that can be copied and plugged into container databases on multiple other machines, such as to achieve replication or horizontal scaling. Archive file 351 may be plugged back into container database 301 to restore (replace) pluggable database 310 to an earlier point in time or to create a new sibling pluggable database that coexists (as a copy) with pluggable database 310.

Database server 300 may create many archives of container database 301 and keep them as archive files. Container database 301 may also be a target into which may be plugged in archive files from elsewhere. Database server 300 may keep those archive files too.

To assist with discovery of archive files that container database 301 has, container database 301 has metadata 320 that contains a file path, such as 341-342, for each archive file. For example, file path 341 locates (points to) archive file 351.

Whenever database server 300 creates a new archive file, database server 300 inserts a file path of the new archive file into metadata 320. Metadata 320 may be associated with (and/or contained within) either of databases 301 or 310.

4.3 Inventory Details

Metadata 320 may contain or be contained within a data dictionary table. Metadata 320 may contain additional information associated with archive file 351.

For example, metadata 320 may have an identifier, timestamp, version or release number, patch level, or other metadata about archive file 351, clone 331, pluggable database 310, container database 301, or database server 300. Any of these details may also be copied into archive file 351. In an embodiment, database server 300 answers a command by emitting a more or less detail-rich listing of archive files based on metadata 320. In an embodiment, database server 300 reacts to a command by using metadata 320 to detect that archive file 352 is the latest for pluggable database 310 and by plugging in archive file 352 to restore pluggable database 310.

5.0 SPARSE CLONING

Figure 4:
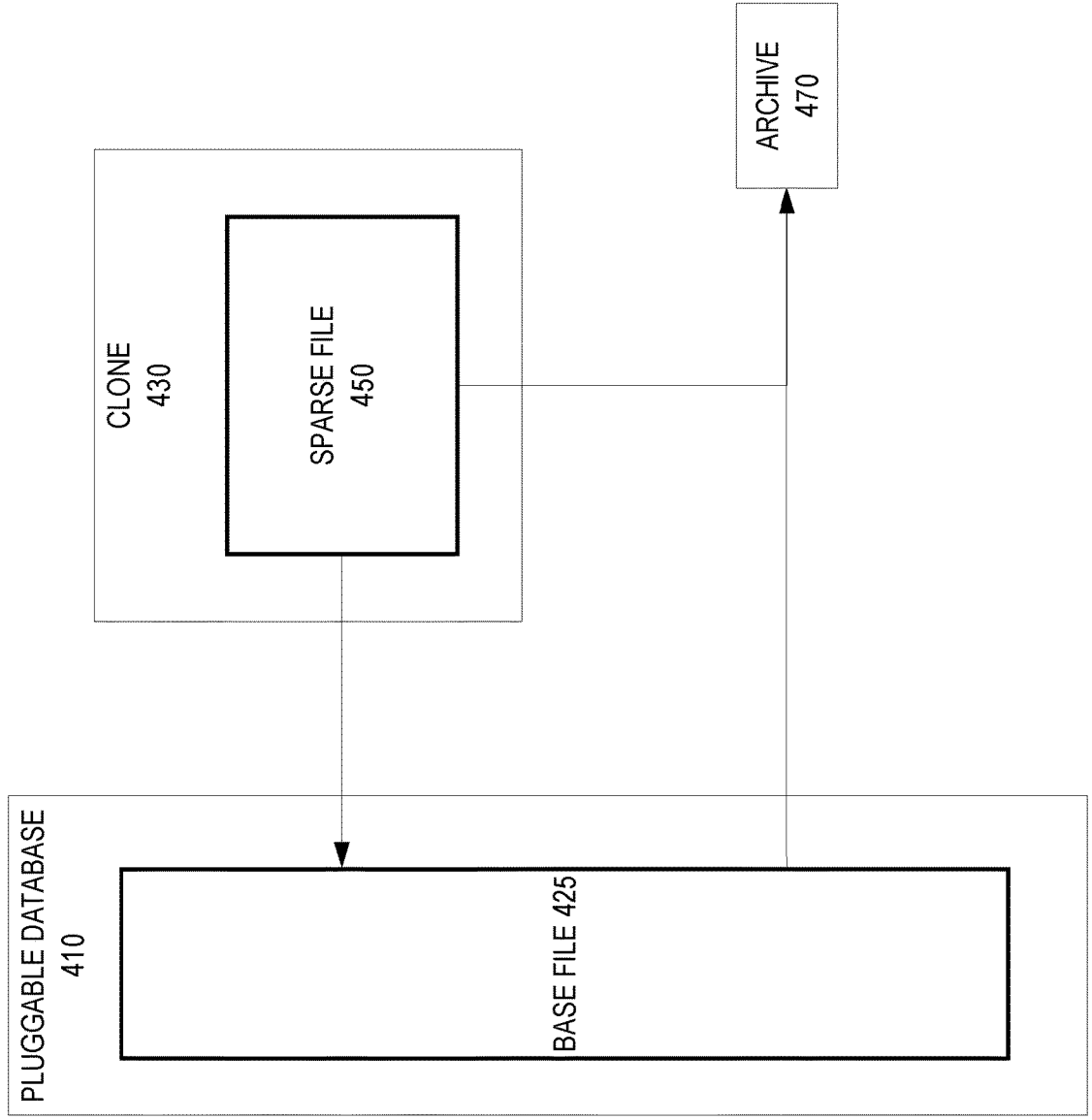
FIG. 4 is a block diagram that depicts an example container database that occupies a database server that uses sparse files to repeatedly create archives from repeated clones of a same pluggable database, in an embodiment.

FIG. 4 is a block diagram that depicts an example container database 400 that occupies a database server that uses sparse files to create an archive from a clone of a pluggable database, in an embodiment. The database server of container database 400 may be an implementation of the source database server of computer system 100.

Container database 400 contains pluggable database 410. The contents of pluggable database 410 includes data files and metadata files, either of which may include at least one base file 425.

5.1 Sparse Files

To make archive 470 of pluggable database 410, the database server may create clone 430. Clone 430 uses sparse files, such as 450, that are each backed by a respective base file, such as 425.

Clone 430 may demand less storage than pluggable database 410, because sparse file 450 is initially only a shallow copy of base file 425. Creating sparse file 450 (instead of actually copying base file 425) also much accelerates creation of clone 430.

In an embodiment, sparse file 450 contains materialized blocks and non-materialized blocks. A materialized block has actual data within actual storage space. A non-materialized block does not have actual storage space, but does have an associated materialized block in base file 425. An attempt to read a non-materialized block in sparse file 450 is implemented by reading the associated materialized block in base file 425.

Sparse file 450 essentially only stores changes that occur to clone 430. In an embodiment, sparse file 450 contains essentially only data blocks that have been updated or created within clone 430.

Because pluggable databases 410 and 430 occupy the same container database 400, they may contain object identifiers that must be unique within container database 400. The database server may assign new identifiers for objects that are copied into clone 430 during creation of clone 430.

For example, sparse file 450 may contain data blocks that contain metadata that is updated to reflect the new identifiers. The contents of clone 430 may be split between sparse file 450 and base file 425.

For example, base file 425 may actually contain two data blocks. Whereas, sparse file 450 may nominally contain two similar data blocks, but actually contain fewer or no data blocks.

One of those two data blocks may be updated within clone 430 while creating clone 430. This causes the updated data block to be written to sparse file 450.

Whereas, the data block that is not updated is stored only in base file 425. As such, the database server reading both data blocks of clone 430 may entail reading the modified data block from sparse file 450 and reading the unmodified data block from base file 425

Archive 470 may contain all of the contents of clone 430. As such, archive 470 may contain a copy of the modified data block and the unmodified data block. As such, the database server reads both of sparse file 450 and base file 425 while creating archive 470.

6.0 COPY ON WRITE

Figure 5:
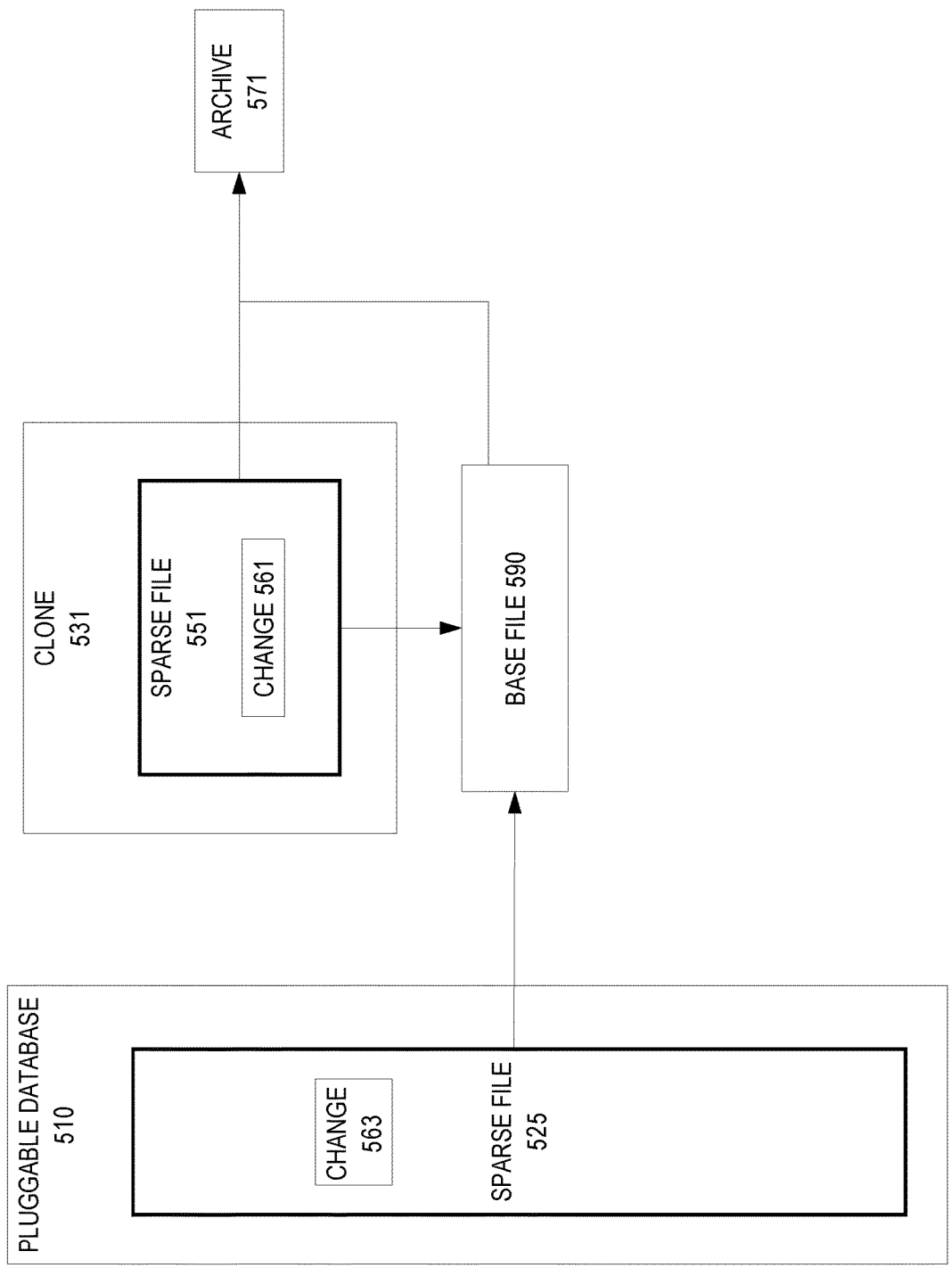
FIG. 5 is a block diagram that depicts an example container database that occupies a database server that uses copy-on-write semantics to manage sparse files, in an embodiment.

FIG. 5 is a block diagram that depicts an example container database 500 that occupies a database server that uses copy-on-write semantics to manage sparse files, in an embodiment. The database server of container database 500 may be an implementation of the source database server of computer system 100.

Container database 500 contains pluggable database 510. Pluggable database 510 includes data files and metadata files.

The contents of those files may be stored within archive 571. As a preface to creating archive 571, the database server creates clone 531 as a shallow copy of pluggable database 510.

Clone 531 contains sparse file 551 to store changes to clone 531, such as change 561. However, clone 531 may be a hot clone.

This means that clone 531 was made from live pluggable database 510, and that the contents of pluggable database 510 may have been modified after creation of clone 531, such as by change 563, such as during an ordinary client transaction. If change 563 is the first change to pluggable database 510 after creation of clone 531, then change 563 has special significance as follows.

Prior to change 563 and although not shown, pluggable database 510 contains base file 590 instead of sparse file 525. Sparse file 551 is backed by base file 590.

Furthermore, base file 590 may have been configured as copy-on-write. Copy-on-write may be a storage or database technology that causes base file 590 to be replaced by sparse file 525 when modification of base file 590 is first attempted.

For example if pluggable database 510 attempts to write change 563 to base file 590 while base file 590 is part of pluggable database 510, then a copy-on-write occurs to base file 590. This copy-on-write causes base file 590 to be replaced within pluggable database 510 by sparse file 525.

Change 563 is actually written into sparse file 525. Even though base file 590 is no longer contained within pluggable database 510, base file 590 is retained by the database server or a storage file system because sparse file 525 is backed by base file 590.

Since creation of clone 531, sparse file 551 is backed by base file 590. After creation of sparse file 525 during the copy-on-write, sparse file 551 continues to be backed by base file 590.

After that, both of sparse files 525 and 551 may be backed by base file 590. That is, base file 590 may be shared by pluggable databases 510 and 531 without actually be contained within either pluggable database. Archive 571 may be created from sparse file 551 and base file 590.

7.0 REPEATED ARCHIVING

Figure 6:
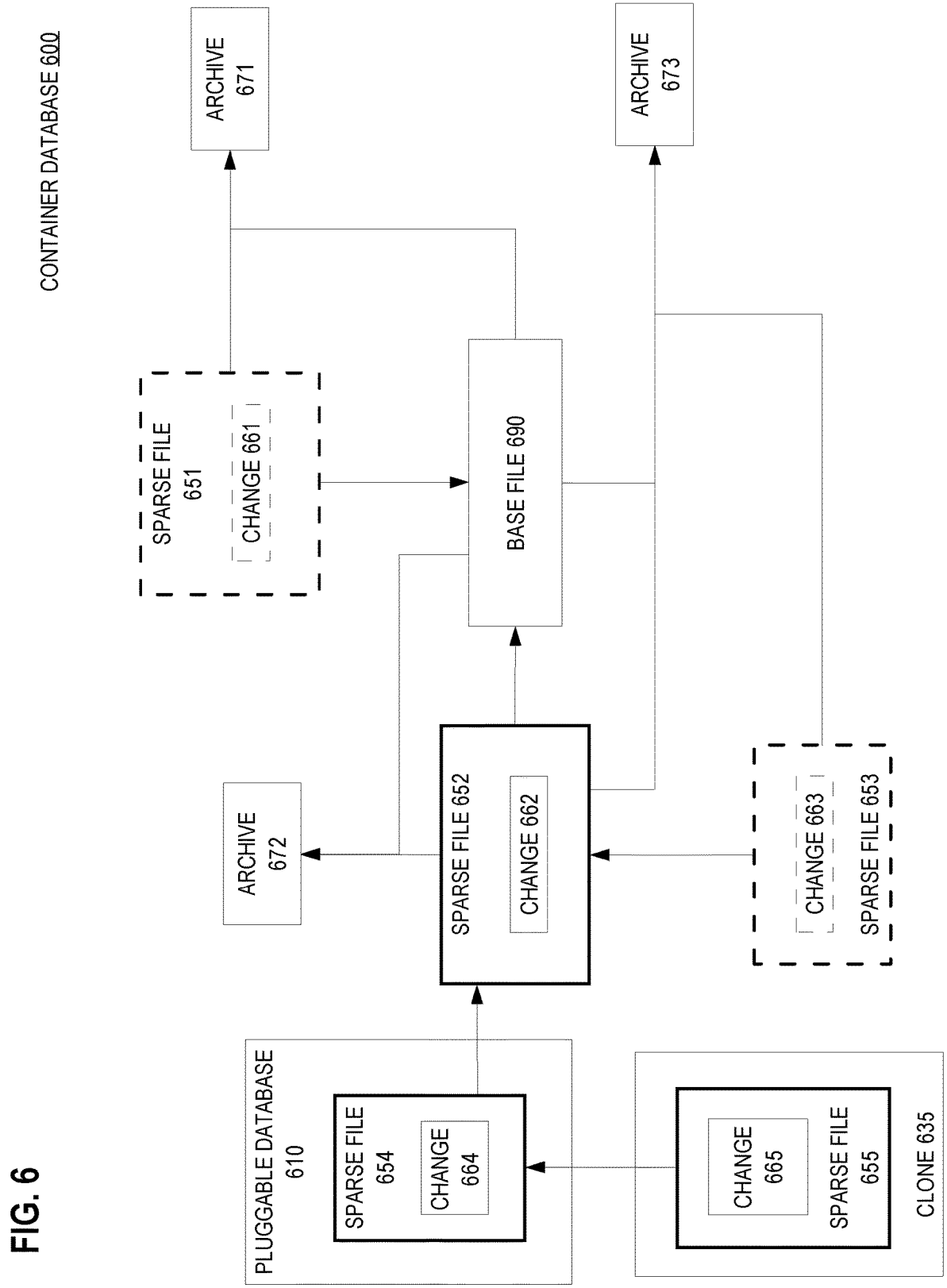
FIG. 6 is a block diagram that depicts an example container database that occupies a database server that uses copy-on-write semantics to facilitate repeated archiving, in an embodiment.

FIG. 6 is a block diagram that depicts an example container database 600 that occupies a database server that uses copy-on-write semantics to facilitate repeated archiving, in an embodiment. The database server of container database 600 may be an implementation of the source database server of computer system 100.

Container database 600 contains pluggable database 610. Archives 671, 672, and 673 are created in sequence (in this recited ordering) from clones of pluggable database 610.

Sparse files 651-655 are created in sequence. FIG. 6 shows a particular moment in time when latest clone 635 is created, but it has not yet been archived.

The database server may delete a clone after creating its archive. For example, sparse files 651-653 are not contained within a clone or other pluggable database. Furthermore if pluggable databases 610 and 635 are stored within a first storage system, and archives 671-673 are stored within a different storage system, then pluggable database 610 may accumulate many archives without increasing demand for the first storage system, so long as each clone is deleted after its archive is created.

Sparse file 652 may endure despite having been part of a clone that has been deleted, so long as sparse file 652 backs another sparse file. In such a situation for example, sparse file 652 may be retained as a backing for sparse files 625 and 653.

However a sparse file may be automatically or manually deleted if it does not back another sparse file and its clone has been deleted. For example, sparse files 651 and 653 are drawn with dashed lines to show that their clones are deleted (even though archives 671 and 673 remain).

Sparse files backing other sparse files may appear as a logical chain of sparse files, as shown. Either the database server or a storage system may remove a sparse file after detecting that the sparse file is no longer referenced for any purpose, such as when a clone is deleted.

The newer is a sparse file, then the more backing files it may have. For example, newest sparse file 655 is backed by a chain of files consisting of base file 690 and by sparse files 652 and 654.

Each file in the chain may contribute materialized blocks. As such, creation of an archive, may require reading all backing files in the chain. For example, an arrow leads from backing files 652-653 and 690 to archive 673.

7.1 Automatic Repetition

In an embodiment, creation of the first clone may also schedule automatic periodic creation of subsequent clones of pluggable database 610. For example, a command to create the first clone may specify a duration between creation of clones.

In that case, no additional command is need to create additional clones because their creation is automatic. However, a subsequent command may be needed to cease periodic archiving of pluggable database 610.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
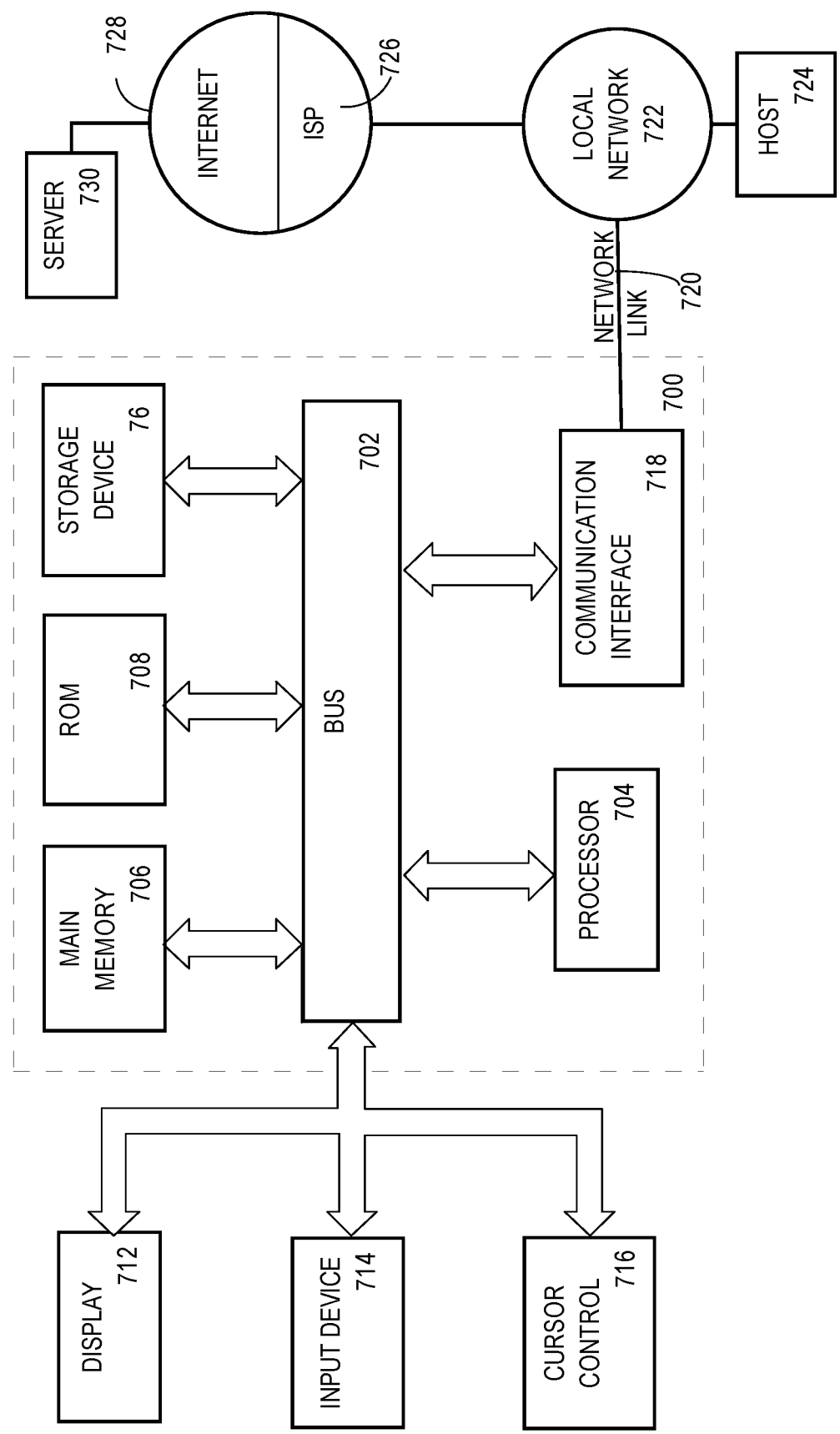
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 76, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 76. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 76. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 76 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 76, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
  creating, while a source pluggable database is in service, a clone of the source pluggable database by:
    creating a clone sparse file that is backed by a base file of the source pluggable database and that can record changes of the clone, and modifying the clone sparse file without modifying the base file;

creating, while the source pluggable database is in service, a database archive of the source pluggable database that is based on the clone of the source pluggable database and the base file;

creating a target pluggable database based on the database archive;

wherein the method is performed by one or more computers.

2. The method of claim 1 wherein:

creating the clone occurs while the source pluggable database has an uncommitted transaction;

creating the clone comprises applying undo records to roll back the uncommitted transaction within the clone.

3. The method of claim 1 wherein creating the target pluggable database comprises:

dropping the source pluggable database from a source container database;

recreating the source pluggable database by creating the target pluggable database within the source container database.

4. The method of claim 1 wherein the source pluggable database and the target pluggable database separately and simultaneously exist.

5. The method of claim 4 wherein the source pluggable database and the target pluggable database occupy different container databases.

6. The method of claim 1 wherein a single archive file entirely contains the database archive.

7. The method of claim 1 wherein creating the database archive comprises inserting a file path of the database archive into metadata of at least one selected from the group consisting of: the clone and a container database that contains the clone.

8. A method comprising:

creating, while a source pluggable database is in service, a clone of the source pluggable database by creating a source sparse file that is backed by a base file of the source pluggable database and that records changes of the source pluggable database made after creating the clone;

modifying, after creating the clone, the source sparse file in response to modifying contents of the source pluggable database;

creating, while the source pluggable database is in service, a database archive of the source pluggable database that is based on the clone of the source pluggable database and the base file.

9. The method of claim 8 wherein creating the clone comprises creating and modifying a clone sparse file that is backed by the base file of the source pluggable database and that records changes of the clone.

10. The method of claim 9 further comprising:

second modifying, after creating the database archive, contents of the source pluggable database;

updating, in response to the second modifying, a second source sparse file that records changes of the source pluggable database and that is backed by the source sparse file;

creating, while the source pluggable database is in service, a second database archive of the source pluggable database that is based on the second source sparse file.

11. The method of claim 10 wherein creating the clone comprises scheduling automatic periodic creation of archives of the clone that includes creation of the database archive and the second database archive.

12. The method of claim 9 wherein:

the clone sparse file is backed by a base file of the source pluggable database;

modifying contents of the source pluggable database comprises copying at least part of the base file.

13. A system comprising:

a communication network configured to transfer files and messages;

one or more computers that are connected to the communication network and configured to:

create, while a source pluggable database is in service, a clone of the source pluggable database by:

creating a clone sparse file that is backed by a base file of the source pluggable database and that can record changes of the clone, and modifying the clone sparse file without modifying the base file;

create, while the source pluggable database is in service, a database archive of the source pluggable database that is based on the clone of the source pluggable database and the base file;

create a target pluggable database based on the database archive.

14. One or more non-transitory computer-readable media storing instructions that, when executed by one or more processors, cause:

creating, while a source pluggable database is in service, a clone of the source pluggable database by:

creating a clone sparse file that is backed by a base file of the source pluggable database and that can record changes of the clone, and modifying the clone sparse file without modifying the base file;

creating, while the source pluggable database is in service, a database archive of the source pluggable database that is based on the clone of the source pluggable database and the base file;

creating a target pluggable database based on the database archive.

15. The one or more non-transitory computer-readable media of claim 14 wherein:

creating the clone occurs while the source pluggable database has an uncommitted transaction;

creating the clone comprises applying undo records to roll back the uncommitted transaction within the clone.

16. One or more non-transitory computer-readable media storing instructions that, when executed by one or more processors, cause:

creating, while a source pluggable database is in service, a clone of the source pluggable database by creating a source sparse file that is backed by a base file of the source pluggable database and that records changes of the source pluggable database made after creating the clone;

modifying, after creating the clone, the source sparse file in response to modifying contents of the source pluggable database;

creating, while the source pluggable database is in service, a database archive of the source pluggable database that is based on the clone of the source pluggable database and the base file.

17. The one or more non-transitory computer-readable media of claim 16 wherein creating the clone comprises creating and modifying a clone sparse file that is backed by the base file of the source pluggable database and that records changes of the clone.

18. The one or more non-transitory computer-readable media of claim 17 wherein:
   the clone sparse file is backed by a base file of the source pluggable database;
   modifying contents of the source pluggable database comprises copying at least part of the base file.

19. The one or more non-transitory computer-readable media of claim 16 wherein the instructions, when executed by one or more processors, further cause:
   second modifying, after creating the database archive, contents of the source pluggable database;
   updating, in response to the second modifying, a second source sparse file that records changes of the source pluggable database and that is backed by the source sparse file;
   creating, while the source pluggable database is in service, a second database archive of the source pluggable database that is based on the second source sparse file.

20. The one or more non-transitory computer-readable media of claim 19 wherein creating the clone comprises scheduling automatic periodic creation of archives of the clone that includes creation of the database archive and the second database archive.

* * * * *